(12) United States Patent
Yamada

(10) Patent No.: US 6,411,931 B1
(45) Date of Patent: Jun. 25, 2002

(54) CHARACTER DATA TRANSFORMER AND TRANSFORMING METHOD

(75) Inventor: Eiichi Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/269,724

(22) PCT Filed: Aug. 10, 1998

(86) PCT No.: PCT/JP98/03554

§ 371 (c)(1),
(2), (4) Date: Dec. 13, 1999

(87) PCT Pub. No.: WO99/08179

PCT Pub. Date: Feb. 18, 1999

(30) Foreign Application Priority Data

Aug. 8, 1997 (JP) .............................................. 9-215210

(51) Int. Cl.⁷ .............................................. G10L 13/08
(52) U.S. Cl. ........................... 704/260; 704/258; 704/7; 704/5
(58) Field of Search ................................. 704/260, 258, 704/235, 277, 275, 5, 6

(56) References Cited

U.S. PATENT DOCUMENTS

| 4,811,400 A | * | 3/1989 | Fisher | 704/260 |
| 5,555,343 A | * | 9/1996 | Luther | 704/260 |
| 5,758,320 A | * | 5/1998 | Asano | 704/258 |
| 5,850,629 A | * | 12/1998 | Holm et al. | 704/260 |
| 5,930,752 A | * | 7/1999 | Kawaguchi et al. | 704/235 |
| 6,070,138 A | * | 5/2000 | Iwata | 704/260 |
| 6,169,789 B1 | * | 1/2001 | Rao et al. | 379/110.01 |

* cited by examiner

*Primary Examiner*—Vijay B Chawan
(74) *Attorney, Agent, or Firm*—Jay H. Maioli

(57) ABSTRACT

An apparatus for converting character data into audio data form includes a storage unit for storing the character data supplied, an operating unit manipulated by the user, and a control unit responsive to the entry of command from the operating unit for producing indicator data indicative of unwanted portions of the character data which are not required for conversion to audio data, comparing the indicator data with the character data read out from the storage unit, and converting the portion of the character data not corresponding to the indicator data into its audio data form. As the character data read out from the storage unit has been compared with the indicator data not indicative of the unwanted portions of the character data required for conversion to audio data, its dedicated portion not corresponding to the indicator data is converted into its audio data form. This allows the dedicated portion of the character data to be readily converted into its audio data form while aborting the unwanted portions of the character data, thus enabling quick acquisition of the information.

29 Claims, 7 Drawing Sheets

Return-Path:<○○ a pav.△△.co.jp>
Date:Fri,9 MAY 97 12:21:54 JST
To:dm
Subject:MESSAGE FROM GENERAL AFFAIRS DEPT.
From:○○<○○@pav.△△.co.jp>

} 21

This is General affairs Dept. See some notices below.

1. We have an office tour for technical staff candidates at the following schedule. Students will pass your section and care should be taken for not exhibiting confidential goods including new products. 5/15, 21, 6/19 15:00~15:30

2. Check for fire detectors shall be carried out on 5/23, 24 (inspection for bell sound on 5/24).

3. The parking is closed on 5/10(Sat.) for repair of the passages (if raining, postponed to 5/17). Do not use private cars for commuting.

4. We have a schedule for modifications on the power supplies and outlets. The sections blackouted before are excluded. The existing outlets (on pillars) shall be modified. Check if your outlets are involved.
501G South EPS 5th and 6th floors on 5/17, 18.   501G North EPS 5th and 6th floors on 6/7, 8.
501G South EPS 3th and 4th floors on 5/24, 25.   501G North EPS 3th and 4th floors on 6/14, 15.
501G South EPS 1th and 2th floors on 5/31, 6/1.  501G North EPS 1th and 2th floors on 6/21, 22.

Consult Mr.... at Administrative Dept., office management GP for details.
Disconnect your OA and other electric appliances where blackout is expected.

Please mind the message.

&*&*&*&*&*&*&*&*&*&*&*&*&*&*&*&*&*&*&*&*&*&*&*&*&*&*
XXXPERSONAL AV COMPANY GA                ○○
XXXXXXTECHNOLOGY CENTER 501G5F    E-mail ○○@pav.△△.co.jp
XXXXXXXXXX-XXXX                   FAX NO. XX-XXXX-XXXXX
TEL NO. XX-XXXX-XXXX
&*&*&*&*&*&*&*&*&*&*&*&*&*&*&*&*&*&*&*&*&*&*&*&*&*

} 22

FIG.3

CHARACTER DATA TRANSFORMER AND TRANSFORMING METHOD

TECHNICAL FIELD

The present invention relates to a character data converting apparatus for converting character data, which has been supplied, e.g., via public telephone communications lines, into audio data, and a method of such conversion. More particularly, the present invention relates to a character data converting apparatus for converting to audio data form, specified by indicator data, character data which has been supplied from outside and stored in a storage unit, thus enabling fast identification and retrieval of desired information in the character data, and a method of such conversion.

BACKGROUND ART

There have widely been used electronic mail system equipped apparatuses for transmitting and receiving character data via a communication means such as a public telephone line or the integrated service digital network (ISDN).

Such apparatuses include dataprocessors, e.g., personal computers and personal digital assistants, and communications devices such as hand-held telephones where character data are received from a communication means such as a public telephone line and converted into audio data which are then released out. The audio data released the such an apparatus or device is converted into an analog audio signal which is transmitted to an electric-to-acoustic converter such as a loudspeaker or an earphone for emitting as audible sound.

Character data transmitted as electronic mails are received in the form of files of unit information and stored in the storage unit of a data processor such as a personal computer or a personal digital assistant. When the conversion of the received character data into audio data is desired, a corresponding file stored in the storage unit is picked up and the character data contained in the file is converted to audio data which is then transmitted to the electric-to-acoustic converter.

The character data in a single file include the address of the sender and the date and time of receipt of its electronic mail. The character data received also include other data which is not required for emitting as audible sound.

For readily identifying the character data received or particular information in the character data, it is desired at the receiver side to convert substantially dedicated, audible character data to its audio data form.

DISCLOSURE OF THE INVENTION

It is an object of the present invention to provide a character data converting apparatus capable of selectively converting a dedicated unit, specified by the receiver, of the character data supplied via a communication means and a method of such conversion.

It is another object of the present invention to provide a character data converting apparatus for converting a specific unit of the character data received, which is dedicated for releasing in the form of audio data, while not converting the other character data which is not dedicated nor designed for conversion to audio data and a method of such conversion.

It is a further object of the present invention to provide a character data converting apparatus capable of identifying the character data supplied via a communication means and stored in a storage unit from their audible form within a short time and a method of such conversion.

It is a still further object of the present invention to provide a character data converting apparatus capable of readily picking up a dedicated unit of the character data supplied from a communication means and stored in a storage unit and converting it to audio data and a method of such conversion.

For achievement of the above object, a character data converting apparatus according to the present invention comprises: a storage unit for storing character data supplied; an operating unit manipulated by the user; and a control unit responsive to the entry of command from the operating unit for producing indicator data indicative of unwanted portions of the character data stored in the storage unit, which is not required for conversion to audio data, and converting other than the unwanted portions specified by the indicator data of the character data read out from the storage unit into its audio data form.

The control unit may have a data converter for converting the character data read out from the storage unit into its audio data form.

The apparatus according to the present invention may further comprise an acoustic converting unit for converting the audio data released from of the data converter into audible sound.

The indicator data produced by the control unit may be adapted for, in response to the entry of command from the operating unit, not converting at least a corresponding portion of the character data read out from the storage unit, which represents punctuation marks, into its audio data form.

Also, the control unit may convert the character data into its audio data form through discretely repeating the reading of a corresponding quantity of the character data from the storage unit in response to the entry of command from the operating unit, hence enabling quick identification of the character data.

Moreover, the control unit may repeat the conversion of a corresponding quantity of the character data read out from the storage unit, which is allocated after the character data of a punctuation mark, into its audio data form.

Moreover, the control unit may convert the character data read out from the storage unit to its audio data form except a start or end portion of the character data.

A method of converting character data according to the present invention comprises the steps of: producing an indicator data indicative of unwanted portions of the character data stored in a storage unit, which are not required for conversion into audio data, in response to the entry of command from an operating unit; and converting other than the unwanted portions specified by the indicator data of the character data read out from the storage unit into its audio data form.

Another character data converting apparatus according to the present invention comprises: a storage unit for storing character data supplied; an operating unit manipulated by the user; and a control unit responsive to the entry of command from the operating unit for producing an indicator data indicative of unwanted portions of the character data stored in the storage unit, which are not required for conversion to audio data, comparing the indicator data with the character data read out from the storage unit, and converting a particular portion of the character data which is not identical to the unwanted portions specified by the indicator data into its audio data form.

Another method of converting character data according to the present invention comprises the steps of: producing an indicator data indicative of unwanted portions of the character data stored in a storage unit, which are not required for conversion into audio data, in response to the entry of command from an operating unit; comparing the indicator data with the character data read out from the storage unit; and converting a particular portion of the character data which is not identical to the unwanted portions specified by the indicator data into its audio data form.

A further method of converting character data according to the present invention comprises the steps of: comparing the character data supplied with at least an indicator data which is indicative of an unwanted portion of the character data required for no conversion into audio data; repeating the conversion of the other portion of the character data which follows the unwanted portion of the character data specified by the indicator data until it is found that another portion of the character data corresponds to the indicator data; and converting the audio data to audible sound for emission.

In the further method of converting character data, when it is found that one portion of the character data corresponds to the indicator data, the other portion of the character data following the one portion specified by the character data may be converted into its audio data form and this action may be repeated until it is found that another portion of the character data corresponds to the indicator data.

Also, in the method, as a first quantity of the character data has been converted into its audio data form, the conversion of another first quantity of the character data which is spaced by a second quantity from the converted first quantity of the character data into its audio data form may be repeated.

The audio data may further be converted to audible sound for emission.

Other objects of the present invention and practical advantages gained by the present invention will be more apparent from the following description of some embodiments.

BRIEF DESCRIPTION OF THE DRAWINGS

FIG. 3 is a diagram showing a group of character data stored in a storage unit;

BEST MODE FOR CARRYING OUT THE INVENTION

The apparatus for converting character data and the method of such conversion according to the present invention will be described in more detail referring to the accompanying drawings.

The character data converting apparatus according to the present invention is designed for use as an electronic mail system based apparatus which transmits and receives the character data over a communications network such as a public telephone line or the ISDN (integrated services digital network). More specifically, among the character data converting apparatuses employed in practice are a data processor such as a personal computer, a personal digital assistant, or an IC recorder capable of receiving character data and a communications apparatus such as a hand-held telephone.

Figure 1:
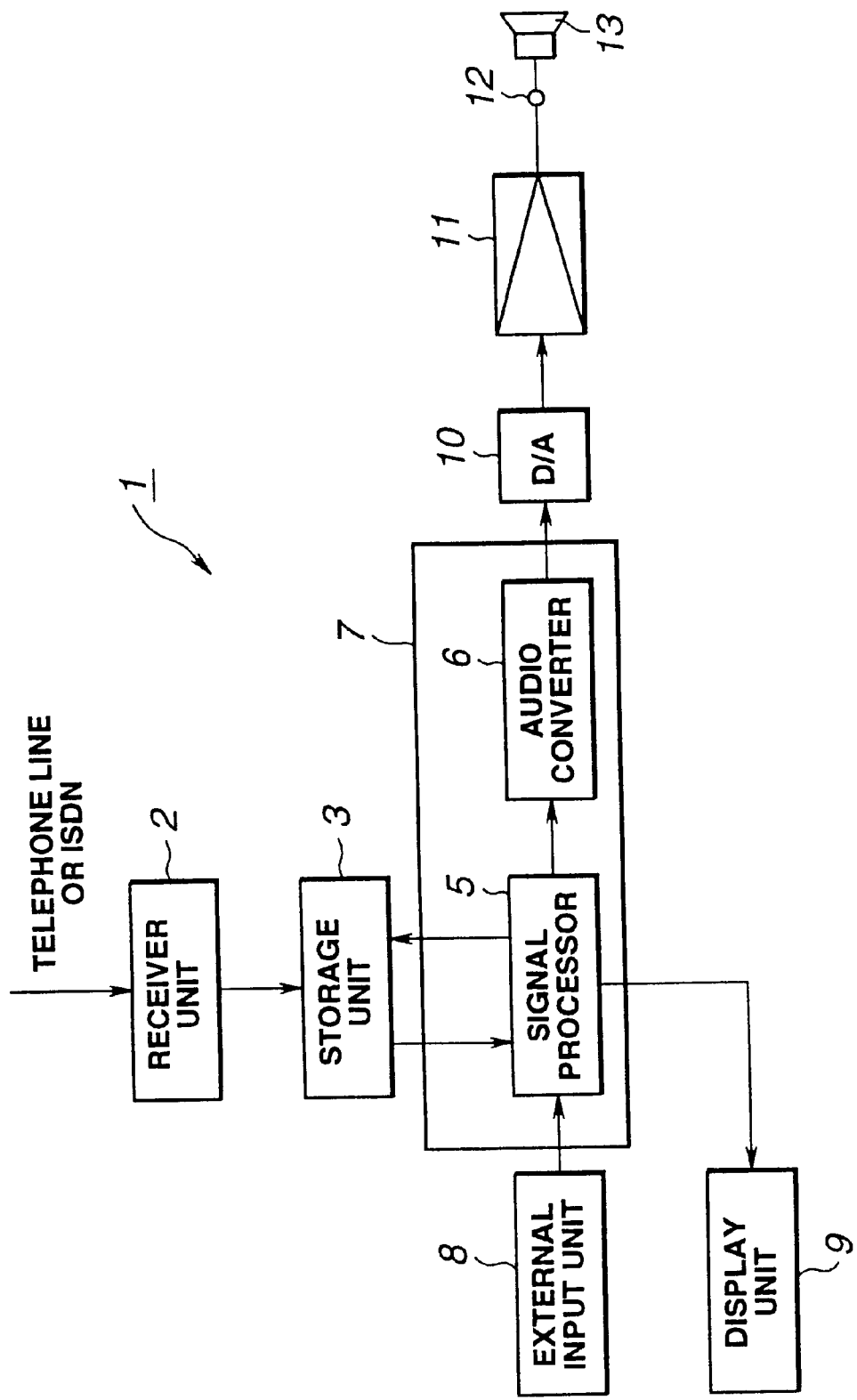
FIG. 1 is a block diagram of a character data converting apparatus according to the present invention.

The character data processing apparatus 1 according to the present invention, as shown in FIG. 1, comprises a receiver unit 2 for receiving the character data of electronic mail transmitted via a communications network such as a public telephone line or the ISDN and a storage unit 3 in which the received character data is stored. The character data is received as files of unit information.

In case that the present invention is embodied in the form of a personal computer, the storage unit 3 may be a recording medium, e.g., a hard disk installed in the computer main housing. If the apparatus is a personal digital assistant or a hand-held telephone, the storage unit 3 may be a RAM installed in the apparatus main body.

The character data transmitted via the public telephone line or the other communications line such as ISDN is the form of ASCII codes.

As shown in FIG. 1, the character data converting apparatus 1 according to the present invention further comprises a control unit 7 which includes a signal processor 5 for receiving the character data read out from the storage unit 3 and producing an indicator data indicative of, for example, other than particular character data which is required for conversion to audio data among the character data in a file, and an audio data converter 6 for converting to audio data form the particular character data which is read out from the storage unit 3 and not specified by the indicator data produced in the signal processor 5.

The character data converting apparatus 1 according to the present invention further comprises an operating unit 8 which can be manipulated by the user for supplying the signal processor 5 in the control unit 7 with a command signal which is provided for generating the indicator data indicative of other than the particular one of the character data which is to be converted to its audio data form. The operating unit 8 may be a keyboard or a mouse when the present invention is embodied in the form of a personal computer and may be a dial key system or a set of function keys when in the form of a personal digital assistant or a hand-held telephone. The command signal given from the operating unit 8 consists mainly of a file indicator signal indicative of a dedicated file of the character data stored in the storage unit 3, a default condition signal indicative of default condition data in the character data read out from the storage unit 3, and other input signals including a skip signal and a scan signal.

The character data converting apparatus 1 according to the present invention further comprises a display unit 9 for displaying a visible image provided for setting various conditions to determine the default in the character data read out from the storage unit 3.

The character data converting apparatus 1 according to the present invention further comprises a D/A converter 10 for converting the audio data output of the audio data converter 6 in the control unit 7 into an analog audio signal, an amplifier 11 for amplifying and delivering the analog audio signal of the D/A converter 10, and an output port 12 for transmitting the analog audio signal from the amplifier 11 to the outside of the converting apparatus 1. The output port 12 is also connected to an electric-to-acoustic converter 13 such as a loudspeaker or an earphone for converting the analog audio signal into audible sound which is then emitted.

The electric-to-acoustic converter 13 may be installed in a personal computer or a hand-held telephone equipped with the character data converting apparatus 1.

Figure 2:
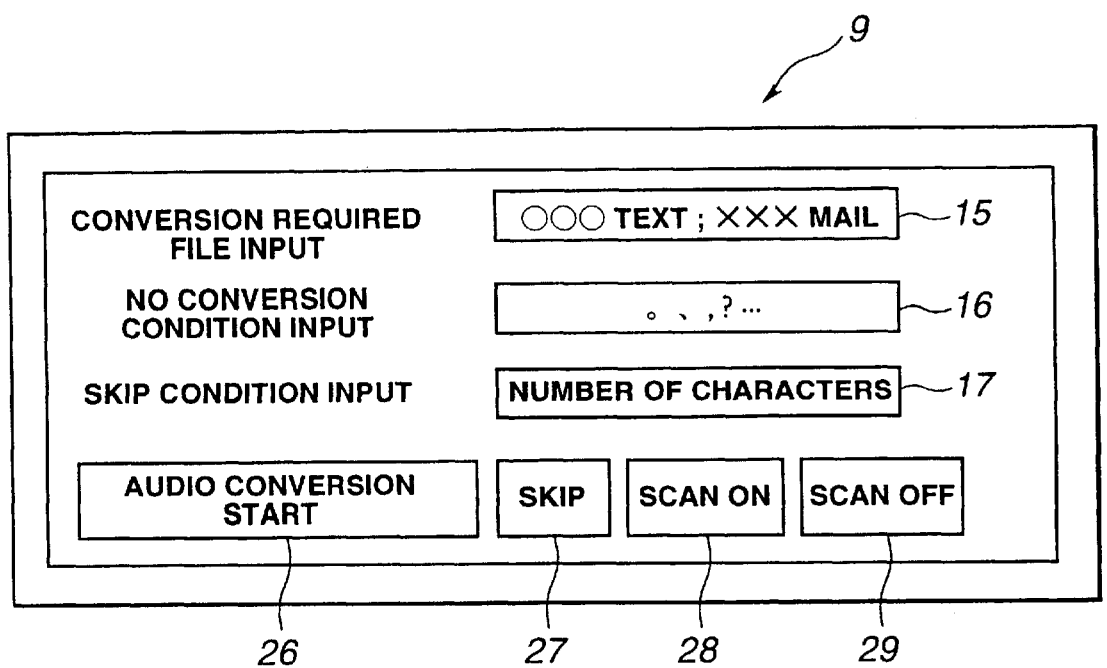
FIG. 2 is a diagram showing an exemplary image displayed on a display.

The character data converting apparatus 1 having the above mentioned arrangement is operated by the user manipulating the operating unit 8 such as a keyboard or a mouse to specify a desired one of the files of character data stored in the storage unit 3 to be converted to an audio data by the audio data converter 6 in the control unit 7 so that information about the desired file is received by the signal processor 5. In response to the information about the desired file, the signal processor 5 generates and sends file indicator data to the storage unit 3. Thus, the character data of the desired file picked up from the storage unit 3 and distributed to a memory working area in the signal processor 5. When the desired file has been read out from the storage unit 3, its text name 15 is displayed on the display unit 9 as shown in FIG. 2.

In the character data converting apparatus 1, operation of the operating unit 8 allows a no conversion instruction indicative of the conditions which permit no conversion of the other data to an audio data among the character data of the desired file to be given to the signal processor 5. Upon receiving the no conversion instruction, the signal processor 5 generates and sends no conversion indicator data to the storage unit 3 while directing the display 9 to display a no conversion data message 16 specified by the no conversion indicator data. The no conversion indicator data from the signal processor 5 is saved in the storage unit 3.

The no conversion indicator data may include, if the character data is of an electronic mail as shown in FIG. 3, group of character data 21 representing address information carried in the front end of the electronic mail and another group of character data 22 representing sender information held in the rear end of the electronic mail. For designating the character data group 21 representing the address information in the electronic mail and the character data group 22 representing the sender information as the no conversion indicator data, pieces of the address and sender information which are formalized can be specified. The no conversion indicator data may also include a punctuation mark (。), a comma (,), a period (.), a question mark (?), an exclamation mark (!), and so on which are unable to be converted to audible sounds.

The character data converting apparatus 1 according to the present invention has a function for, when a particular group of character data in the desired file is selected, accessing the desired file, skipping to the particular group of character data in the file, and converting a set of the character data allocated to the skipped location to its audio data form. For skipping other than the particular group of character data in the desired file to be converted to the audio data, a skip condition data indicative of the character data to be skipped is entered through manipulating the operating unit 8. The skip condition data may include a blank data of more than one line, a punctuation mark (。), a comma (,), a period (.), a question mark (?), an exclamation mark (!), and so on in the character data of the desired file.

The skip condition data entered by manipulating the operating unit 8 is delivered to the signal processor 5. Upon receiving the skip condition data, the signal processor 5 generates and sends skip indicator data to the storage unit 3 while directing the display unit 9 to display a skip condition data message 17 specified by the skip indicator data. The skip indicator data delivered from the signal processor 5 is stored in the storage unit 3.

Figure 4:
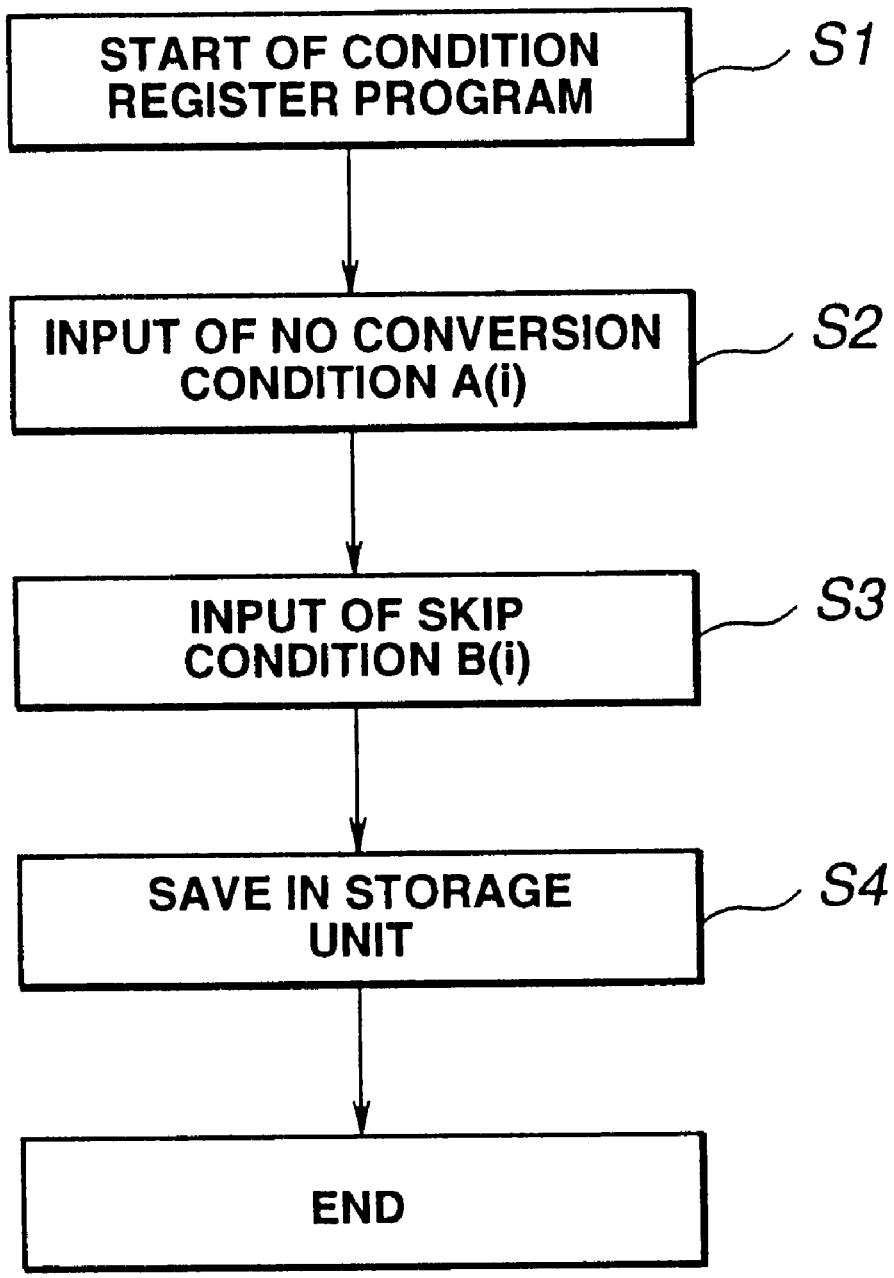
FIG. 4 is a flowchart showing a procedure of setting default conditions.

A procedure of producing the no conversion indicator data and the skip indicator data described above is now explained referring to the flowchart of FIG. 4.

For producing the no conversion indicator data and the skip indicator data, the character data converting apparatus 1 is energized and a condition register program stored in the storage unit 3, for example, is started up by a program readout command signal supplied from the control unit 7, as shown in FIG. 4. As the condition register program has been started, a screen image shown in FIG. 3 is displayed on the display unit 9.

At Step S2, the no conversion data instruction is entered by the user manipulating the operation unit 8 and transmitted to the signal processor 5 where it is used for producing the no conversion indicator data.

At Step S3, the skip condition instruction is entered by the user manipulating the operation unit 8 and transmitted to the signal processor 5 where it is used for producing the skip condition indicator data.

At Step S4, the no conversion indicator data and the skip indicator data produced at Steps S3 and S4 are delivered from the signal processor 5 and saved in the storage unit 3.

Simultaneously, the display command signal from the control unit 7 is transmitted to the display unit 9 for displaying a conversion start button 26, a skip button 27, a scan on button 28, and a scan off button 29 as shown in FIG. 2. By the user manipulating the operating unit 8 to select those buttons 26 to 29 displayed on the display unit 9, the control unit 7 is controlled to read out a particular group of character data specified by the file indicator data of the signal processor 5 in the control unit 7 and convert it into audio data.

In the case that the present invention is applied to a personal computer, the operation unit 8 is a keyboard or a mouse. The buttons 26 to 29 displayed on the display unit 9 can thus be selected with the use of a pointer controlled by the cursor key or the mouse. If the present invention is applied to a personal data assistant or a hand-held telephone, the buttons 26 to 29 displayed on the display unit 9 can be selected with the use of a set of function keys provided on the apparatus.

The conversion start button 26 is a button switch which gives a conversion start command when is selectively driven by manipulating the control unit 8. As the conversion start button 26 has been tuned on, the conversion start command is generated. The conversion start command is given to the signal processor 5 which in turn delivers the conversion indicator data to the audio data converter 6. The audio data converter 6 then starts converting corresponding character data read out by the signal processor 8 from the storage unit 3 into audio data. The skip button 27 is a button switch which gives a skip command when is selectively driven by manipulating the control unit 8. As the skip button 27 has been tuned on, the skip command is generated and delivered to the signal processor 5 in the control unit 7. In response to the skip command, the signal processor 5 produces and delivers the skip condition data to the audio data converter 6. Upon receiving the skip condition data, the audio data converter 6 releases its corresponding audio data.

More specifically, the skip command is provided for producing the skip indicator data for controlling the audio data converter 6 to skip to and convert the particular unit of character data to the audio data.

According to the present invention, the skip button 27 may be replaced with any key, other than the cursor keys on the keyboard of a personal computer, which is designated for producing the skip command.

Both the scan on button 28 and the scan off button 29 are used for scanning and converting the character data to its audio data form. More specifically, when the scan on button 28 is turned on by manipulating the operating unit 8, the scan signal is generated and delivered to the signal processor 5 in the control unit 7. Upon receiving the scan signal, the signal processor 5 produces the scan indicator data and releases it to the audio data converter 6. More particularly, the signal processor 5 instructs the audio data converter 6 to repeat an action of converting a group of character data following the character data specified by the scan condition data into audio data for emitting as audible sound.

The scan off button 29 is used for canceling the scan action. When the scan off button 29 is turned on by manipulating the operating unit 8, a scan off signal is generated and delivered to the signal processor 5 in the control unit 7. Upon receiving the scan off signal, the signal processor 5 produces and releases scan off indicator data to the audio data converter 6 and then produces an audio data conversion control signal for directing the audio data converter 6 to convert the character data to the audio data.

Also, the audio data converter 6 receives the character data from the storage unit 3 via the signal processor 5 and the indicator data produced by the signal processor 5. In the audio data converter 6, at least a particular unit of the character data received from the storage unit 3 is converted to the audio data by control of the indicator data. More specifically, the audio data converter 6 is controlled to convert data other than the character data which is designated as default condition data to not be subjected to conversion into audio data with the signal processor 5 comparing between the character data and the default condition or no conversion data.

The comparison between the character data read out from the storage unit 3 and the default condition or no conversion data is carried out in the following manner. The character data stored in the storage unit 3 is picked up and mapped in a RAM of the signal processor 5 according to the file indicator data supplied from the signal processor 5 to the storage unit 5. Each of the character data is then compared with its corresponding data allocated to the RAM in the signal processor 5.

Figure 5:
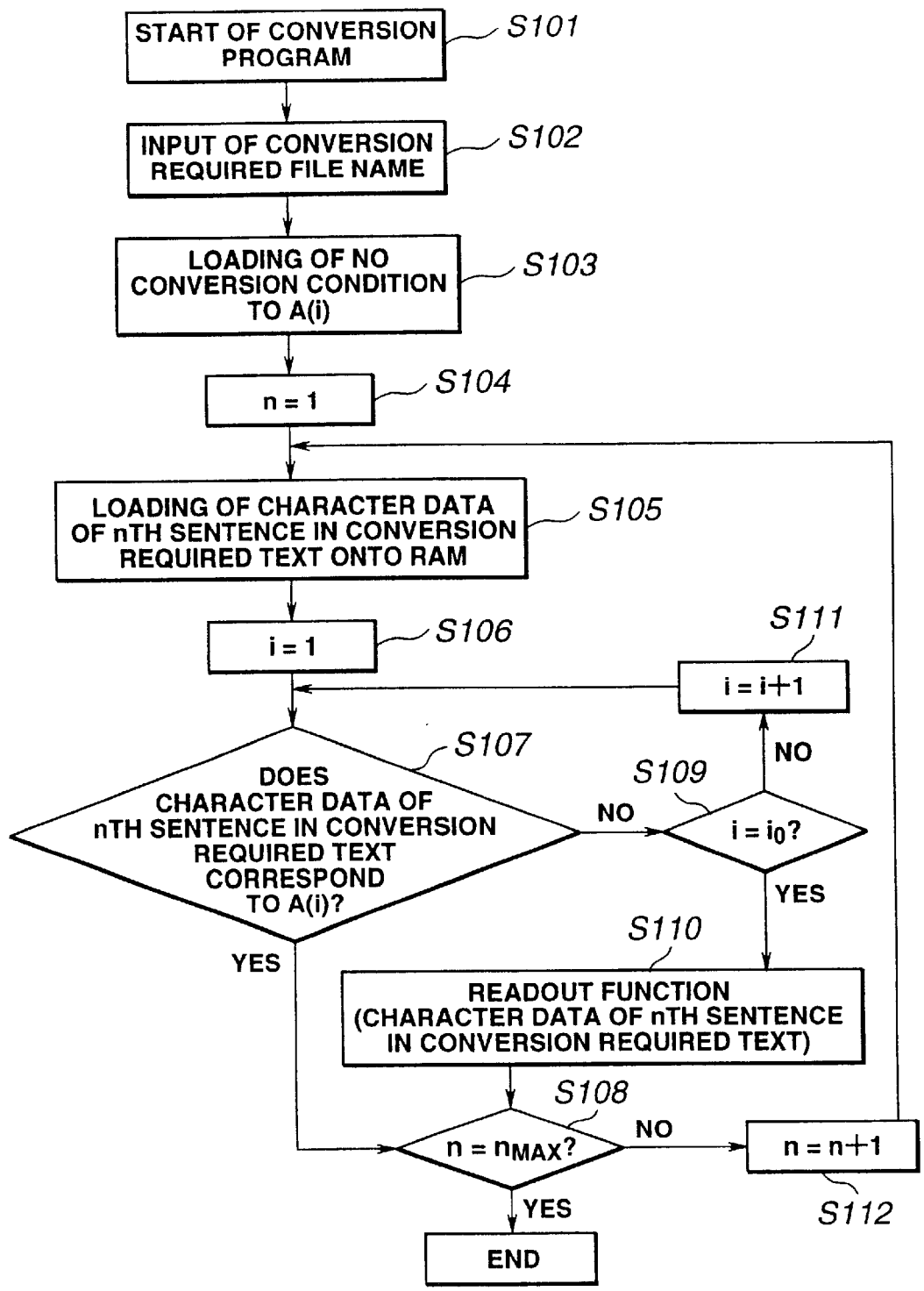
FIG. 5 is a flowchart showing a procedure of emitting a sound through comparing between the character data and the default conditions in the conversion of the supplied character data to audio data for releasing as audible sound.

The character data converting apparatus 1 of the present invention having the above mentioned structure allows the character data to be received in the form of electronic mail by its receiver unit 2 from a communications network such as a public telephone line or the ISDN line and converted to their audio data form by the control unit 7 executing the flowchart shown in FIG. 5. The flowchart shown in FIG. 5 illustrates the action of the signal processor 5 and the audio data converter 6 in the control unit 7.

For converting the character data received by the receiver unit 2 and saved in the storage unit 3 into the audio data which is thus emitted as audible sound, a program for carrying out the character data conversion is commenced in the control unit 7. More specifically, a program read out command signal from the signal processor 5 in the control unit 7 directs reading out the conversion program from the storage unit 3 and transferring it to the signal processor 5 at Step S101. As the conversion program has been started, such a screen image as shown in FIG. 3 is displayed on the display unit 9.

Step S102 then follows where the operating unit 8 selects desired one of the files stored in the storage unit 3, which carries a particular group of character data to be converted to its audio data form (referred to as a conversion required text hereinafter). When the conversion required text stored in the storage unit 3 has been selected by manipulating the operating unit 8, the signal processor 5 in the control unit 7 produces the file indicator data and the dedicated character data of the conversion required text (referred to as $n_{max}$ hereinafter) and saves them in the storage unit 3.

At Step S103, the no converion message 16 indicating such as a punctuation mark (∘), a comma (,), a period (.), a question mark (?), an exclamation mark (!), and so on is entered by the user manipulating the operating unit 8. The operating unit 8 generates and delivers a default condition data A(i) to the signal processor 5. The default condition data A(i) is saved in the RAM of the signal processor 5 as a series of data where the factor is i. The maximum value of i is predetermined and expressed by $i_0$.

At Step S104, the command for reading out the first of the character data from the storage unit 3, i.e. the order n of the character data A in the file is 1, is released from the signal processor 5.

At Step S105, the nth character data in the conversion required text is loaded onto the RAM of the signal processor 5. It is understood that the conversion required text comprises a series of character data where n is 1, 2, . . . , and $n_{max}$. At Step S106, the signal processor 5 determines i=1 specifying the first default condition data A(i=1).

At Step S107, the signal processor 5 compares between the nth character data of the conversion required text saved at Step S105 and the default condition data A(i) generated according to the no conversion message 16. As n=1 and i=1 at the beginning, the signal processor 5 examines at Step S107 whether or not the first character data in the conversion required text corresponds to the default condition data A(1). When the nth character data in the conversion required text does not correspond to the default condition data A(i), the procedure moves to Step S109. When the nOth character data in the conversion required text corresponds to the default condition data A(i), the procedure goes to Step S108.

It is then examined by the signal processor 5 at Step S109 whether i is equal to $i_0$ or not, i.e. whether the nth character data has been compared with the final default condition data $A(i_0)$ or not. When i=$i_0$, the procedure goes to Step S110. When i is $i_0$, the procedure returns back to Step S105.

At Step S110, as it is judged at Step S107 that the nth character data in the conversion required text, for example, the first character data at n=1, is not a default one which needs no conversion, the character data is transferred from the signal processor 5 in the control unit 7 to the audio data converter 6. In the audio data converter 6, the first character data, for example, is converted into its audio data form. The audio data produced by the audio data converter 6 is delivered to the D/A converter 10 where it is converted into an analog signal which is an audio signal released from the output terminal 12.

At Step S111, as it is judged at Step S109 that i is not $i_0$, i.e. the nth character data has not been compared with the default condition data (i), i=i+1 is established for comparison with the default condition data and the procedure goes back to Step S107. Then, the steps S107 to S111 are repeated.

More particularly in the routine from Step S107 to Step S111, when the nth character data in the conversion required text has been loaded into the RAM of the signal processor 5, it is compared with all the default condition data A(1) to A($i_0$). When it is judged that the nth character data in the conversion required text corresponds to none of the default condition data A(1) to A($i_0$), the procedure goes to Step S109 where the character data is converted into the audio data.

It is examined by the signal processor 5 at Step S108 whether or not the nth character data in the conversion required text is the final one, i.e. n=$n_{max}$. When the nth character data in the conversion required text is not the final one or n=$n_{max}$, the procedure moves to Step S112 where the next character data following the character data examined at Step S107 is addressed. The procedure starts again from Step S105 and the (n+1)th character data in the conversion required text is loaded onto the RAM of the signal processor 5.

According to the prescribed procedure, the signal processor 5 compares the character data in the conversion required text with the default condition data A(i) at Step S107 and when judging that it corresponds to none of the default condition data A(i), permits the character data to be converted into the audio data by the audio data converter 6. Then, the audio data is further converted to an analog audio signal by the D/A converter 10 and released out. This allows the character data in the conversion required text read out from the storage unit 3 to be converted to an audio signal while at least data other than the dedicated character data is aborted.

Figure 6:
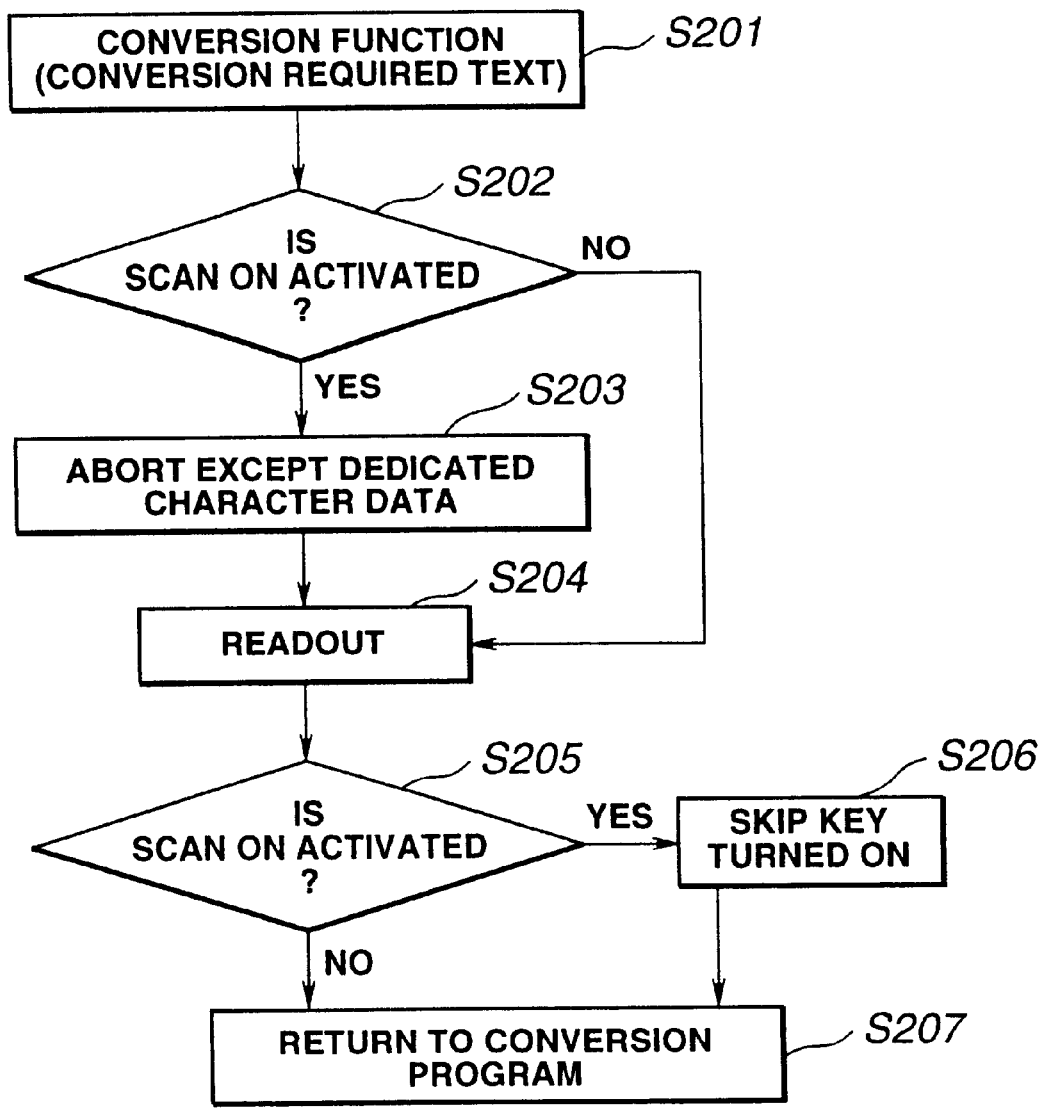
FIG. 6 is a flowchart showing a procedure of scanning while the sound is being emitted.

An action of the character data converting apparatus 1 where the header portion of each sentence in a conversion required text which comprises a plurality of sentences is scanned and converted into its audio data form before it is released out as an audio signal from the audio data converter 6 is now explained referring to the flowchart of FIG. 6.

The action of scanning and converting the header portion of each sentence in the conversion required text into its audio data form starts with Step S201 shown in FIG. 6 and carries out the flowchart of FIG. 5 for converting the dedicated character data into an audio data which is then converted to audio signal and released out as audible sound. The scanning is intermediately performed during the action when the character data of further sentences succeeding the current sentence of which the header portion is converted into its audio data form is addressed by the user.

It is examined by the signal processor 5 at Step S202 whether the scan on button 28 shown in the screen image of FIG. 2 is turned on or not while the character data in the conversion required text is released out as audible sound. When the scan on button 28 is turned on by the user manipulating the operating unit 8 and its scan command is released from the operating unit 8, the procedure goes to Step S203. When the scan on button 28 is not turned on with the operating unit 8, the procedure moves to Step S204. More particularly, the scan signal is generated by manipulating the operating unit 8 and transmitted to the signal processor 5 in the control unit 7. The signal processor 5 examines whether the scan signal is received or not and Step S203 or S204 follows.

When the scan on button 28 has been turned on, a quantity of character data in a unit length of the character data, which is other than a dedicated set of the character data to be converted into its audio data form, is aborted before another dedicated set of the character data is converted. The dedicated set of the character data is predetermined by the user. The dedicated set of the character data to be converted may be set to a length which extends, e.g., after the punctuation mark in the skip condition message 17. The dedicated set of the character data is displayed on the display unit 9 shown in FIG. 2 together with the skip condition message 17.

When the punctuation mark, for example, is specified as the skip condition data, the dedicated set of the character data after the punctuation mark is converted into its audio data form which is further converted to an audio signal and released as audible sound from the electric-to-acoustic converter 13. The remaining of the character data in the sentence extending to the punctuation mark designated as the reference point is hence aborted. Upon detecting the punctuation mark, each dedicated set of the character data following the punctuation mark is converted into its audio data form. By repeating this procedure, the sentences in the conversion required text are addressed and their character data are emitted as audible sound.

When the conversion start button 26 is turned on during the scanning over the conversion required text, the scanning is canceled.

At Step S204, the indicator data is produced for directing the audio data converter 6 to convert a dedicated set of the character data following those aborted at Step S203 into its audio data form.

It is examined at Step S205, like Step S202, whether the scan on button 28 is turned on or not by manipulating the operating unit 8. When it is judged that the scan on button 26 is turned on by the user manipulating the operating unit 8, the procedure goes to Step S206. As the scan on button 26 has been turned on, the scanning is skipped from the dedicated set of the character data addressed at Step S204 to a succeeding set of the character data to be converted.

At Step S207, the succeeding set of the character data addressed by skipping at Step S206 is subjected to conversion into the audio data. When the scan on button 28 is not turned on at Step S205, the character data is converted into its audio data form using a conversion function determined at Step S201.

At Step S206, as the skip button 27 is turned on with the scan on button 28 being turned on at Step S205, the conversion of the succeeding dedicated set of the character data following the punctuation mark designated as the reference point is canceled and the indicator data indicative of default character data to be aborted is generated. Then, Step S207 follows where the indicator data is supplied to the audio data converter 6 for allowing the conversion of the dedicated set of the character data into the audio data.

Figure 7:
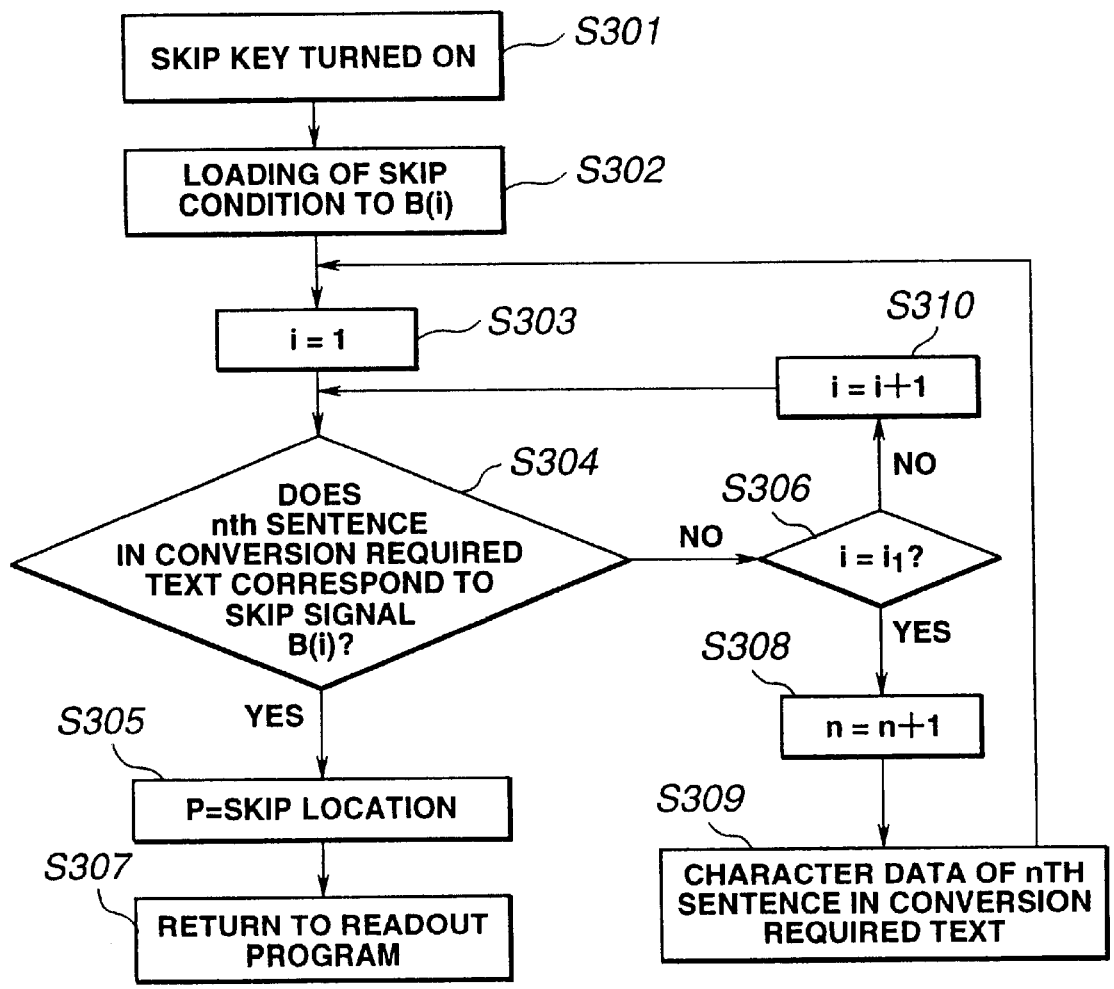
FIG. 7 is a flowchart showing a procedure of skipping while the sound is being emitted.

Described referring to the flowchart of FIG. 7 is a procedure of converting a dedicated set of the character data in a conversion required text with the user using the skip button 27 while the character data in electronic mail stored in the storage unit 3 is converted into its audio data form for releasing as audible sound.

The procedure starts with Step S301 where turning on of the skip button 27 by the user manipulating the operating unit 8 permits the skip command to be delivered from the operating unit 8 to the signal processor 5 in the control unit 7. More specifically, when the skip condition message 17 has been entered from the screen image shown in FIG. 3, the signal processor 5 in the control unit 7 receives the skip command signal and sends it as no conversion character data information to the storage unit 3.

The skip condition data may include default character data, such as punctuation marks, which permits no conversion to audio data.

At Step S302, the operating unit 8 upon receiving the skip condition message 17 releases the skip signal. The skip signal is transmitted to the signal processor 5 in the control unit 7 where a skip condition data B(i) is produced and loaded to the storage unit 3 for a corresponding file to be converted.

At Step S303, the first group (i=1) of the skip condition data is determined. The skip condition data comprises a group of B(1) to B($i_1$). More particularly, the skip condition data is a string of signal having B(1), B(2), ..., B(i), B(i+1), ..., and B($i_1$).

At Step S304, the skip condition data B(i) produced from the skip condition message 17 is compared by the signal processor 5 with the nth sentence in the conversion required text read out from the storage unit 3. More specifically, Step S304 compares each sentence, for example, in the conversion required text with the skip condition requirements and examines whether or not the character data of the sentence corresponds to the skip condition data B(i) produced from the skip condition message 17. When the nth sentence in the conversion required text corresponds to the skip condition data B(i) produced from the skip condition message 13, the procedure goes to Step S305. When the nth sentence in the conversion required text does not correspond to the skip condition data B(i) produced from the skip condition message 17, the procedure moves to Step S306.

At Step S305, the signal processor 5 produces an indicator data for conversion of the dedicated character data allocated at a target skip location to its audio data form. Because the audio data converter 6 is controlled to convert the dedicated character data allocated at the target skip location to its audio data form, the other character data extending in the conversion required text from the current location where its dedicated character data is being converted to its audio data form to the target skip location are not converted into their audio data form but skipped over with the skip command released from the operating unit 8.

At Step S304, according to the audio data conversion information produced at Step S307, the audio data is converted into character data by the manner illustrated in the flowchart of FIG. 5.

It is also examined at Step S306 by the signal processor 5 whether or not the skip condition data produced from the skip condition message 17 for the character data of the nth sentence in the conversion required text is a skip signal expressed by B($i_1$). When the skip condition data corresponds to B($i_1$), the procedure goes to Step S308.

At Steps S308 and S309, another sentence (n+1) in the conversion required text succeeding the sentence compared at Step S304 is addressed and compared with the skip condition data B(i) at Step S303.

When it is judged at Step S304 that the skip condition data does not correspond to B($i_1$), the procedure moves to Step S310. At Step S310, as it is judged at Step S306 that the skip condition data from Step S304 does not correspond to B($i_1$), the following skip signal B(i+1) is called and the procedure moves back to Step S304. More particularly, as illustrated in the flowchart of FIG. 7, the nth sentence in the conversion required text is loaded onto the RAM in the signal processor 5 and its character data is compared with the skip condition data B(1) to B($i_1$). When it is judged at Steps S306, S310, and S304 that the character data of the nth sentence in the conversion required text corresponds to none of the skip condition data B(1) to B($i_1$), the procedure goes to Step S305 where the conversion skips to the nth sentence and then advances to Step S307 where character data of the nth sentence is converted by the manner shown in the flowchart of FIG. 5 into its audio data form which is thus converted and released as an analog audio signal.

Accordingly, the character data converting apparatus 1 of the present invention allows the user to skip over unwanted character data in a conversion required text without subjecting them to the conversion to audio data and pursue the conversion of dedicated character data into its audio data form at efficiency so that its desired information only can be obtained in the form of audible sound.

INDUSTRIAL APPLICABILITY

As set forth above, the character data converting apparatus and the method of such conversion according to the present invention are designed for converting a dedicated character data into its audio data form in an audio converter according to the indicator data which indicates default character data required for no conversion to audio data, thus prohibiting the conversion of unwanted character data determined by the user into their audio data form and permitting the conversion of the dedicated character data into its audio data or audible form. This allows the information stored in a storage unit as character data to be efficiently identified and readily retrieved from the storage unit.

What is claimed is:

1. A character data converting apparatus comprising:
   a storage unit for storing character data representing textual sentences supplied thereto;
   an operating unit manipulated by a user;
   an extracting unit for extracting an end of a sentence from the character data; and
   a control unit responsive to entry of a command from the operating unit for producing indicator data indicative of unwanted portions of the character data stored in the storage unit, which are not required for conversion to audio data, and converting data that is not part of the unwanted portions specified by the indicator data of the character data read out from the storage unit into audio data form,
   wherein the control unit repeatedly converts into audio data a predetermined number of the character data allocated after the end of the sentence extracted by the extraction unit.

2. The character data converting apparatus according to claim 1, wherein the control unit comprises a data converter for converting the character data read out from the storage unit into audio data form.

3. The character data converting apparatus according to claim 2, further comprising an acoustic converting unit for converting data in audio data form released from the data converter into audible sound.

4. The character data converting apparatus according to claim 1, wherein the indicator data produced by the control unit is adapted for, in response to entry of the command from the operating unit, indicating that at least a corresponding portion of the character data read out from the storage unit, which represents punctuation marks, should not be converted into audio data form.

5. The character data converting apparatus according to claim 1, wherein the control unit repeats the conversion of the character data read out from the storage unit, which is allocated after character data of a punctuation mark, into audio form.

6. The character data converting apparatus according to claim 1, wherein the control unit converts the character data read out from the storage unit to audio data form except for a start portion of the character data.

7. The character data converting apparatus according to claim 6, wherein the control unit converts the character data read out from the storage unit to its audio data form except for an end portion of the character data.

8. A method of converting character data representing textual sentences, the method comprising the steps of:
produccing indicator data indicative of unwanted portions of the character data stored in a storage unit, which is not required for conversion into audio data, in response to the entry of a command from an operating unit;
extracting an end of a sentence from the character data; and
converting character data other than the unwanted portions specified by the indicator data of the character data read out from the storage unit into audio data form,
wherein the step of converting repeatedly converts into audio data a predetermined number of the character data allocated after the end of the sentence extracted in the step of extracting.

9. The method of converting character data according to claim 8, wherein the indicator data produced is adapted for, in response to the entry of command from the operating unit, indicating that at least a corresponding portion of the character data read out from the storage unit, which represents punctuation marks, should not be converted into audio data form.

10. The method of converting character data according to claim 8, wherein conversion of the character data read out from the storage unit, which is allocated after character data of a punctuation mark, into audio data form is repeated.

11. The method of converting character data according to claim 8, wherein the character data read out from the storage unit is converted into audio data form except for a start portion of the character data.

12. The method of converting character data according to claim 11, wherein the character data read out from the storage unit is converted into its audio data form except for an and portion of the character data.

13. The method of converting character data according to claim 8, wherein the data in audio data form is further converted into audible sound for emission.

14. A character data converting apparatus comprising:
a storage unit for storing character data representing textual sentences supplied thereto;
an extracting unit for extracting an end of a sentence from the character data; and
a control unit responsive to entry of a command from the operating unit for producing indicator data indicative of unwanted portions of the character data stored in the storage unit, which are not required for conversion to audio data, comparing the indicator data with the character data read out from the storage unit, and converting a particular portion of the character data which is not identical to the unwanted portions specified by the indicator data into audio data form,
wherein the control unit repeatedly converts into audio data a predetermined number of the character data allocated after the end of the sentence extracted by the extraction unit.

15. The character data converting apparatus according to claim 14, wherein the control unit comprises a data converter for converting the character data read out from the storage unit into audio data form.

16. The character data converting apparatus according to claim 15, further comprising an acoustic converting unit for converting the data in audio data form released from the data converter into audible sound.

17. The character data converting apparatus according to claim 14, wherein the indicator data produced by the control unit is adapted for, in response to the entry of the command from the operating unit, indicating that at least a corresponding portion of the character data read out from the storage unit, which represents punctuation marks, should not be converted into audio data form.

18. The character data converting apparatus according to claim 14, wherein the control unit repeats the conversion of the character data read out from the storage unit, which is allocated after the character data of the punctuation mark, into audio data form.

19. The character data converting apparatus according to claim 14, wherein the control unit converts the character data read out from the storage unit to audio data form except for a start portion of the character data.

20. A method of converting character data representing textual sentences, the method comprising the steps of:
producing indicator data indicative of unwanted portions of the character data stored in a storage unit, which are not required for conversion into audio data, in response to entry of a command from an operating unit;
comparing the indicator data with the character data read out from the storage unit;
extracting an end of a sentence from the character data; and
converting a particular portion of the character data which is not identical to the unwanted portions specified by the indicator data into audio data form,
wherein the step of converting repeatedly converts into audio data a predetermined number of character data after the end of the sentence extracted in the step of extracting.

21. The method of converting character data according to claim 20, wherein the indicator data produced is adapted for, in response to entry of a command from the operating unit, indicating that at least a corresponding portion of the character data read out from the storage unit, which represents punctuation marks, should not be converted into audio data form.

22. The method of converting character data according to claim 20, wherein the conversion of the character data read out from the storage unit, which is allocated after the character data of a punctuation mark, into audio data form is repeated.

23. The method of converting character data according to claim 20, wherein the character data read out from the storage unit is converted into audio data form except for a start portion of the character data.

24. The method of converting character data according to claim 23, wherein the character data read out from the storage unit is converted into audio data form except for an end portion of the character data.

25. A method of converting character data representing textual sentences, the method comprising the steps of:
comparing supplied character data with at least indicator data indicative of an unwanted portion of the character data not required for conversion into audio data;
repeating the conversion of a portion of the character data which follows the unwanted portion of the character data specified by the indicator data until another portion of the character data corresponding to the indicator is found;
extracting an end of a sentence from the character data; and
converting the data in audio data form to audible sound for emission,
wherein the step of converting repeatedly converts into audio data a predetermined number of the character data allocated after the end of the sentence extracted by the step of extracting.

26. The method of converting character data according to claim 25, wherein when one portion of the character data corresponds to the indicator data, another portion of the character data following the one portion specified by the character data is converted into audio data form and conversion is repeated until a portion of the character data is found that corresponds to the indicator data.

27. The method of converting character data according to claim 25, wherein the indicator data is predetermined at least one.

28. The method of converting character data according to claim 25, wherein when a first quantity of the character data has been converted into audio data form, the conversion of another first quantity of the character data which is spaced by a second quantity from the converted first quantity of the character data into audio data form is repeated.

29. The method of converting character data according to claim 25, wherein the data in audio data form is further converted to audible sound for emission.

* * * * *